United States Patent [19]

Qureshi et al.

[11] Patent Number: 4,771,523

[45] Date of Patent: Sep. 20, 1988

[54] METHOD OF APPLYING LOW GLOSS NYLON COATINGS

[75] Inventors: Gulzar A. Qureshi, Tinley Park; David A. Shotts, Naperville, both of Ill.

[73] Assignee: Allied Tube & Conduit Corporation, Harvey, Ill.

[21] Appl. No.: 104,782

[22] Filed: Oct. 5, 1987

[51] Int. Cl.[4] .............................................. B23P 23/00
[52] U.S. Cl. ................................... 29/527.4; 29/33 D; 427/27; 427/29; 427/32
[58] Field of Search .............. 29/527.4, 33 D; 427/27, 427/29, 32

[56] References Cited

U.S. PATENT DOCUMENTS

| | | | |
|---|---|---|---|
| 3,559,280 | 2/1971 | Mailhiot et al. | 29/527.4 |
| 3,616,983 | 11/1971 | Kamimura et al. | 228/5 |
| 3,708,321 | 1/1973 | Spieles | 117/17 |
| 3,947,384 | 3/1976 | Schulde et al. | 260/2 N |
| 3,965,551 | 6/1976 | Ostrowski | 29/33 D |
| 4,007,298 | 2/1977 | Feehan et al. | 427/195 |
| 4,104,416 | 8/1978 | Parthasarathy et al. | 427/29 |
| 4,244,985 | 1/1981 | Graff et al. | 427/27 |
| 4,268,579 | 5/1981 | Suzuki et al. | 428/413 |

Primary Examiner—Howard N. Goldberg
Assistant Examiner—Carl J. Arbes
Attorney, Agent, or Firm—Fitch, Even, Tabin & Flannery

[57] ABSTRACT

A method for making endless lengths of nylon coated metal tubing which coating has high mechanical strength characteristics and a low gloss surface finish. The method includes passing the formed tubing through a first powder coating region and applying a layer of nylon generally uniformly surrounding the circumference of the tubing. This first nylon powder coating is heated sufficiently to cause the nylon coating to achieve complete melt-flow into a continuous first nylon coating region which would have a relatively high gloss. The coated tubing is next passed through a second powder coating region with the surface temperature of the first coating still above the melting temperature of the nylon. At this second coating region a second powder coating of the same type of nylon is applied. The second coating is cooled below the melting point of the nylon before the second coating completely melts leaving the outer surface with a very low gloss surface finish.

8 Claims, 1 Drawing Sheet

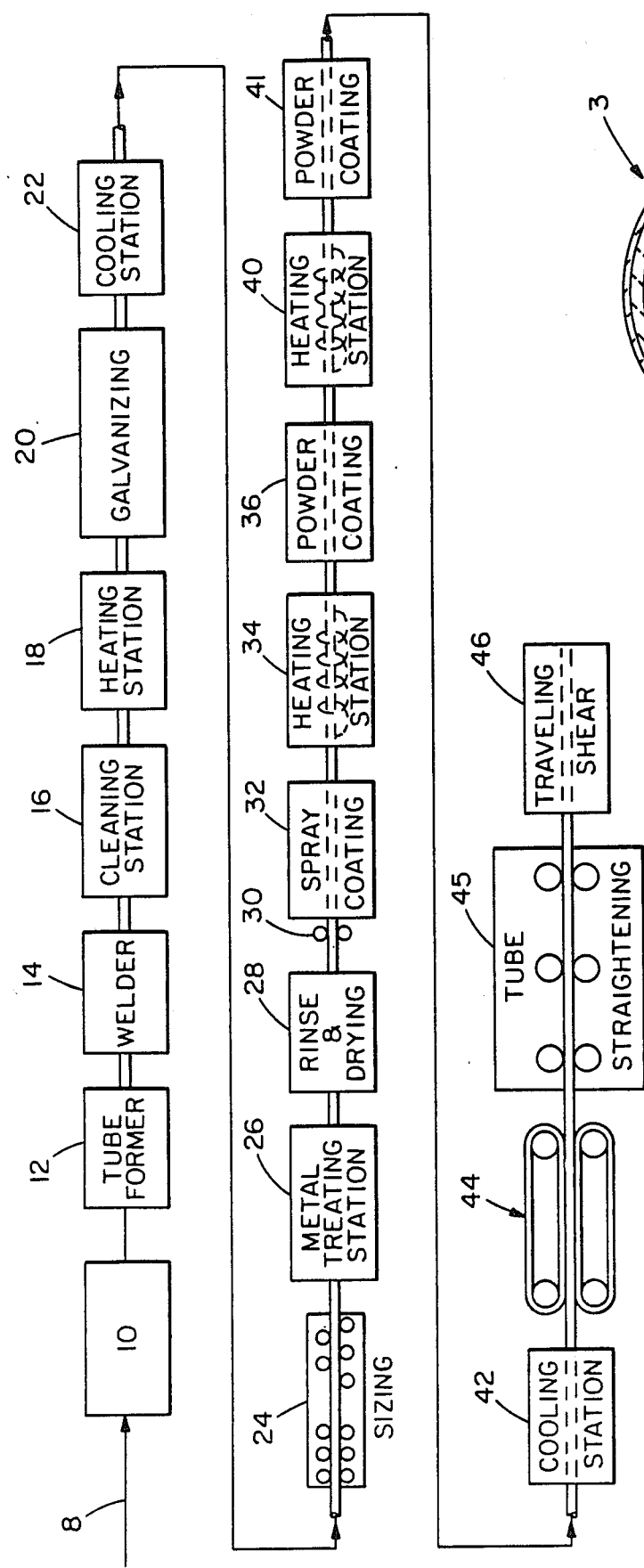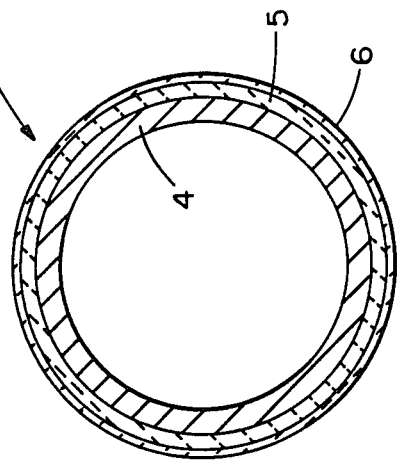
FIG. 1
FIG. 2

METHOD OF APPLYING LOW GLOSS NYLON COATINGS

The present invention relates to the continuous forming and coating of tubing and, more particularly, to forming steel tubing from strip stock and providing a thin nylon coating of uniform thickness which provides protection for the steel tubing and has a low gloss surface finish.

BACKGROUND OF THE INVENTION

It well known to produce endless lengths of welded steel tubing from strip stock and to continuously galvanize that tubing by providing a zinc coating on the exterior surface as taught, for example, in U.S. Pat. Nos. 3,122,114 and 3,230,615 which are owned by the assignee of this patent application. It is likewise known to continuously apply polymeric coatings to the exterior of such continuously formed tubing, employing various thermoplastic and thermosetting resins, as for example taught in U.S. Pat. Nos. 3,559,280; 3,616,983; 3,667,095; 3,965,551 and 4,621,399.

A preferred method of providing a plastic coating on the exterior of the tubing is by passing the formed tubing through a preheating station and then through a powder coating station having a chamber including a particulate fluidized bed of thermoplastic particles or a spray chamber. The coating station is part of an in-line, continuous, roll-forming, tube mill production line including upstream stations where the steel strip is formed into a tubular configuration and the edges thereof welding together by, for example, an induction welder.

It is known to use nylons 11 and 12 for the plastic coating to provide decoration and for limited surface protection of the steel tubing. It is also known to use these nylons for applications where greater mechanical strength of the plastic coating is required, as where the coating is stretched due to bending of the tubing or where abrasion resistance and increased toughness is needed. When the nylon coating is intended to supply primarily mechanical strength as opposed to only decoration and when the nylon is applied to tubing moving at high speed and cured over time, the nylon coating should be applied and subjected to a temperature greater than its melting point for sufficient time for the nylon to flow and strongly bond to the tubing surface, thereby forming a matrix about the encircled tubing.

Whenever a nylon coating undergoes melt-flow, a high gloss surface finish is developed. For example, a coating formed of nylon 11 may have a specular gloss (measured as a percent of the incident light at a 60 degree angle per ASTM Method D523-67) of 70% reflectance. However, high gloss surface finishes are sometimes undesirable. Addition of pigments and fillers to the coating to obtain a matte surface finish reduces its elongation characteristics and limits fabrication of coated tubing.

SUMMARY OF THE INVENTION

Among the various aspects and features of the present invention may be noted the provision of an improved method of manufacturing nylon-coated tubing. The tubing made according to the method of the present invention has a coating made of the same nylon having good fabrication properties but with a desirable low gloss or matte surface finish. As will be discussed later in greater detail, the specular gloss measured as a percent of incident light is reduced from about 70% reflectance to about 10% reflectance. This is achieved by providing an inner or structural coating in which the nylon has fully melted and flowed to form a matrix, and an outer or cosmetic coating of the same material which is fused to the inner coating but was prevented from fully achieving melt-flow. The method of the present invention can be practiced with only slight modification to existing production lines for manufacturing nylon-coated steel tubing. The resulting tubing is corrosion and abrasion resistant, is reliable in use, has long service life, and is easy and economical to manufacture. Other aspects and features of the method of the present invention will be, in part, apparent and, in part, pointed out hereinafter in the following specification and in the accompanying drawings.

Briefly, a method embodying various aspects of the present invention includes the following steps:

1. A metal strip is formed into tubing as the strip moves along a straight-line longitudinal path.
2. Adjacent lateral edges of the moving strip are continuously welded to complete the tubing.
3. A primer is applied by a spray or a flood and wipe method to act as an adhesive for the nylon coating.
4. The tubing is heated to a temperature of at least about 110° F.
5. The heated tubing is passed through a first powder coating region where a layer of nylon powder is applied generally uniformly surrounding the circumference of the tubing.
6. The coated tubing is further heated sufficiently to cause the nylon coating to achieve complete melt-flow into a continuous first nylon coating region at least about 2 mils thick which would have a relatively high gloss.
7. The coated tubing with the outside surface of the nylon coating still above the melting point of the nylon is passed through a second powder coating region where a second powder coating of the same type nylon as applied to the tubing at the first powder coating region is applied. The second coating has a thickness less than the thickness of the first coating and the second coating thickness is at least about 0.5 mil.
8. The second coating is cooled below the melting point of the nylon before complete melting of the outside surface of the second coating occurs, leaving the outer surface with a relatively low gloss exterior finish.

BRIEF DESCRIPTION OF THE DRAWINGS

FIG. 1 is a diagrammatic illustration, in block form, of an in-line, continuous, roll-forming tube mill production line, including sequential powder coating stations, embodying various aspects of the method of the present invention; and FIG. 2 is a cross-sectional view of nylon coated steel tubing made in accordance with the present invention.

DESCRIPTION OF THE PREFERRED EMBODIMENT

A cross section of nylon coated steel tubing 3 resulting from the practice of the method of the present invention is shown in FIG. 2. The coated tubing includes a steel tube 4, an inner nylon coating region 5 which is preferably nylon 11 or 12 and which has been melted and allowed to flow to form a plastic matrix about the tube 4, and an outer coating region 6 which is formed of the same nylon as the inner coating. The outer coating is fused to the inner coating but did not achieve full melt-flow and has a low gloss surface finish. The composite nylon coating, formed by inner coating 5 and outer coating 6, provides the desideratum of a nylon coating having excellent elongation and toughness properties with a low gloss surface coating.

A preferred embodiment of an in-line, continuous, roll-forming tubing mill production line embodying various features of the invention is illustrated in FIG. 1 wherein the stations are shown diagrammatically and some details are omitted from the upstream portion of the production line wherein the continuous forming, welding and galvanizing occurs. A more detailed description of these various stations is found in the aforementioned patents.

Although the overall production line is illustrated as including a galvanizing station, in its broadest aspects, the invention is considered to be valuable whether or not the formed and welded tubing is first galvanized. Although the term "galvanizing" is used, this term is employed in its broadest sense and is not intended to be restricted to the employment of pure zinc as, for example, an alloy of zinc with aluminum could be used.

The overall apparatus of FIG. 1 depicts a production line in which each of the stations is considered to be treating steel strip moving from left to right. At the upper left-hand corner, strip 8 is shown which is being supplied from a suitable roll source (not shown). The strip travels past an end welder (not shown), known in the art for splicing an end of one roll to another roll at the required time, and enters an accumulator 10 wherein a sufficient length of strip is stored to supply the line while adjacent ends are being welded. Likewise, the edges of the strip may be appropriately treated so as to be ready for welding at the time that the strip 8 enters a tube former 12. The tube former 12 is constituted by a series of conventional forming rolls whereby the strip is continuously deformed from its initial flat character to that of a rounded tube with the edges of the strip in approximately abutting relation to form the seam of the tube upon welding.

The continuous tubular form created by the tubeformer 12 advances directly to a welder 14 where the edges of the strip are joined by welding, preferably using an induction welder. After the welding is complete and scarfing of the outer surface in the welded region is effected, the tubing is passed to a washing and pickling station 16 where cleaning and removal of oxides occur. This station may include an alkali wash for removing grease from the surface of the tubing, followed by rinsing and then acid treatment for pickling the surface, followed by a further rinse, all of which are well known in the prior art and described in the earlier-mentioned patents.

Following the cleaning station 16, the tubing passes to a first heating station 18 which is located prior to a galvanizing bath 20 and which preferably utilizes induction heating, although other types of heating can be employed, to bring the tubing up to the desired temperature prior to its entry into the galvanizing bath 20. In order to guard against oxidation of the cleaned tubing, an inert or nonoxidizing atmosphere, for example, nitrogen, is used to surround the tubing from the time at which it enters the heating station 18 until it passes into the zinc bath. The details of preferred embodiments with respect to providing such an atmosphere are set forth in the aforementioned patents.

In the heating station, the tubing is preferably preheated to a temperature above the melting point of the galvanizing material, and as a result, the continuously moving heated tubing picks up a uniform coating of zinc or zinc alloy as it passes through the bath. Appropriate wiping is effected at the exit from the zinc bath, and the galvanized tubing proceeds immediately to a cooling station 22, which may be a water-filled quench tank. After cooling to the desired temperature is effected, the galvanized tubing next enters a sizing and straightening station 24.

Following straightening, an optional metal treating station 26 is provided wherein the galvanized tubing is treated by chromating, phosphating or the like. By treating the galvanized surface with a chromate and nitric acid solution, a zinc chromate outer film is created which provides even greater resistance to oxidation. If such a metal treating station 26 is provided, a rinse and an air drying station 28 is included immediately thereafter.

In this upstream region of the production line, there is ample opportunity to support the tubing against sagging as a result of gravity, and of course the sizing and straightening rolls provide such support as well as drive the tubing longitudinally. However, the final support 30 for the tubing downstream of the metal treating station 26 until it reaches the take-off assist device is located just past the drying station 28. The support rollers 30 assure both vertical and horizontal alignment of the tubing of the location.

Just downstream of this point of last support, the tubing enters a liquid spraying station 32 where a coating, in liquid form, can be applied, as for example by a plurality of atomizing spray heads. The station 32 is designed to provide a primer coating prior to applying a thicker nylon coating in powder form at a downstream location.

The tubing next proceeds to an induction heating station 34 which preheats the tubing prior to its entry into the first powder coating station 36 which is next in line. However, whenever a liquid coating is applied to the tubing, the induction heating station 34 serves to dry the coating by removing the remainder of the solvent and to also cure any resin which might be included therein.

Under the usual conditions, the primary function of the heating station 34 is to raise the temperature of the tubing to that desired for the powder-coating application. This temperature will vary with the particular powder composition being used; however, it will generally be in the range from about 110° F. to about 400° F., and at least be to the melting point of the powder-coating material being applied. Because the tubing will usually already have been either galvanized or coated with a primer, it is not felt necessary to provide a nonoxidizing atmosphere at the induction heating station 34, and in any event, the temperature to which the tubing is raised will usually not be as high as that employed in the heating station 18 just prior to galvanizing.

The powder coating may be applied in any manner suitable for treating a fast-moving article, for example, electrostatic spray, or by an electrostatic-fluidized bed process, all of which are known in the prior art. The employment of such powder-coating processes for coating pipe is shown in U.S. Pat. No. 3,616,983. The powder coating station 36 forms a first powder coating region wherein a nylon powder, either nylon 11 or 12, is applied. It is considered important to closely control the thickness of this first coating so that the inner coating region, of the completed tubing 3 has a thickness in the range of 2.5 to 4 mils.

Immediately after the first powder coating station 36, the tubing enters a further heating station 40, preferably containing one or more induction heating units, where melt-flow of the first powder coating takes place. To produce a high gloss finish a temperature in the range of 450° F. to 500° F. is considered adequate for nylon 11 which has a melting point of 370° F., while a temperature range of 430° F. to 480° F. is considered adequate for nylon 12, having a melting point of 350° F. However to produce a matte finish, a temperature range of 390° F. to 420° F. is recommended for nylon 11 and a temperature range of 370° F. to 400° F. is recommended for nylon 12. The heating of the tubing at heating station 40 causes complete melt-flow of the first nylon coating to form a plastic matrix which is strongly bonded to the steel tube and has the desired elongation and toughness characteristics in tubing 3. Initially the induction heating at the station 40 will begin the actual fusing, and how much heat the first nylon coating continues to absorb from its environment determines the precise melt-flow performance. Of course, the amount of heat absorbed by a continuously moving tube is a function of both time and temperature.

Upon exit from the heating station 40, the tubing immediately moves to a second powder station 41 which may be of the same type as powder coating station 36. The station 41 forms a second powder coating region where the second coating, of the same nylon powder as the first nylon coating, is applied. The outer surface temperature of the first nylon coating at the location of the second powder coating is above the melting point of the nylon and is preferably in the range of 380° F. to 410° F. for nylon 11 and in the range of 360° F. to 390° F. for nylon 12, depending on production line speed and time. The second powder coating fuses to the surface of the first nylon coating. However, before the second powder coating can achieve full melt-flow, its temperature is quickly reduced below the melting point of the nylon by virtue of its introduction into a cooling station 42. It will be appreciated that the residence time and temperature of the second powder coating before quenching can be varied to produce a range of exterior finishes on the second or outer coating. Shorter times will produce somewhat textured finishes, whereas some gloss will result from increased time which permits some melt-flow of the second nylon coating. The thickness of the second nylon coating 6 that is applied is preferably in the range of 0.5-1 mil; it, of course, fuses with the first coating and becomes substantially indistinguishable therefrom in its final form.

The cooling station 42, preferably utilizing a water quench, also lowers the temperature of the nylon exterior coating to a level that it will not be adversely affected by contact with the take-off assist device 44 (fully described in commonly-assigned U.S. Pat. No. 3,965,551), which is located immediately thereafter. An ancillary roller support for the continuously moving tubing could be provided at a location in the water quench station 42 where the temperature of the polymer will have fallen below a suitable level where such contact may occur without detriment to the surface. However, inasmuch as this point would be of necessity quite close to take-off assist device 44, such additional support is considered to be unnecessary. A traveling shear 46 is preferably employed to sever the tubing to desired lengths. A tube straightening station 45 might optionally be employed between the cooling station 42 and the shear 46.

The specular gloss of inner coating 5, measured as a percent of incident light at a 60° angle per ASTM method D523-67, would be in the range of about 65% to 75% reflectance if the second coating was not employed. The specular gloss for the second or outer coating 6 is preferably in the range of about 5% to 10% reflectance.

A method for making endless lengths of nylon coated metal tubing 3 according to the method of the present invention includes the following steps:
1. A metal strip is formed into tubing as the strip moves along a straight-line longitudinal path.
2. Adjacent lateral edges of the moving strip are continuously welded to complete the tubing.
3. A primer is applied to act as an adhesive for the nylon coating.
4. The tubing is heated to a temperature of at least about 110° F.
5. The heating tubing is passed through a first powder coating region where a layer of nylon powder is applied generally uniformly surrounding the circumference of the tubing;
6. The coated tubing is further heated sufficiently to cause the nylon powder coating to achieve complete melt-flow into a continuous first nylon coating at least about 2 mils thick which would have a relatively high gloss.
7. The coated tubing, with the outside surface of the nylon coating still above the melting point of the nylon, is passed through a second powder coating region where a second powder coating of the same type nylon is applied having a thickness at least about 0.5 mil but less than the first coating.
8. The second coating is cooled below the melting point of the nylon before complete melt-flow of the outside surface of the second coating occurs so that the second coating has a relatively low gloss exterior finish.

A specific example of the practice of the method of the present invention is as follows. For steel tubing having an outside diameter of 0.75 inch and a wall thickness of 0.049 inch, the speed of the roll-forming tubing mill production line could be 300 ft/min. For nylon 11 manufactured by ATOCHEM Polymers, Inc. and having an average particle size of 30 microns, the tubing temperatures could be raised to about 120° F. at heating station 34. The tubing enters the first powder coating station 36 at a temperature of about 115° F. approximately 4 sec. after exiting the heating station 34. About 1 sec. after leaving the first powder coating station 36, the tubing arrives at heating station 40 where the temperature of the first nylon coating is raised to about 410° F. In the approximately 4 sec. required for the tubing to reach the second powder coating station after its departure from the heating station 40, the first nylon coating has achieved full melt-flow. The surface temperature of the outside surface of the first coating region is about 400° F. upon entrance to the second powder coating station. About 1 sec. after leaving the second powder coating station the tubing reaches the cooling station 42 where the temperature of the second coating is reduced below the melting point of the nylon 11.

In view of the above, it will be seen that the several objects of the invention are achieved and other advantageous results attained.

As various changes could be made without departing from the scope of the invention, it is intended that all matter contained in the above description or shown in the accompanying drawings shall be interpreted as illustrative and not in a limiting sense.

What is claimed is:

1. A method for making endless lengths of nylon-coated metal tubing, which method comprises the following steps:
   a. forming metal strip into tubing as the strip moves along a straight-line longitudinal path;
   b. continuously welding adjacent lateral edges of said moving strip to complete the tubing;
   c. heating said tubing to a temperature of at least about 110° F.;
   d. passing said heated tubing through a first powder coating region and applying a layer of nylon generally uniformly surrounding the circumference of the tubing and having a thickness of at least about 2 mils;
   e. further heating the coated tubing sufficiently to cause the outside surface of said nylon coating to completely melt-flow into a continuous first nylon region;
   f. passing the coated tubing while its outside nylon surface is above the melting point of the nylon through a second powder coating region and applying a second coating of the same type nylon, said second coating having a thickness at least about 0.5 mils but less than the thickness of said first coating; and
   g. cooling the second coating below the melting point of the nylon before complete melt-flow of the outside surface of said second coating occurs so that the exterior surface of said coated has a relatively low gloss.

2. A method as set forth in claim 1 wherein the total thickness of the first and second nylon coatings is in the range of 3 to 5 mils and the thickness of said second coating is in the range of 0.5 to 1 mil.

3. A method as set forth in claim 1 wherein the nylon powder forming the first coating is heated to a higher temperature in step (e) than the temperature of the outside surface of the first coating at the time of application of the nylon powder forming the second coating.

4. A method as set forth in claim 1 wherein the nylon forming the coatings is nylon 11, the temperature to which the coated tubing is heated in step (e) is in the range of 390° F. to 420° F. and the temperature of the tubing at the second powder coating region being in the range of 380° F. to 410° F.

5. A method as set forth in claim 1 wherein the nylon forming the coatings is nylon 12, the temperature to which the coated tubing is heated in step (e) is in the range of 370° F. to 400° F. and the temperature of the tubing at the second powder coating region is in the range of 360° F. to 390° F.

6. A method as set forth in claim 1 wherein the nylon forming the coatings is applied by spraying.

7. A method as set forth in claim 1 wherein said tubing is quenched sufficiently fast after application of the second coating that the second coating has a textured finish.

8. A method as set forth in claim 1 further comprising the step of applying a primer to the tubing between the aforementioned steps (b) and (c).

* * * * *

UNITED STATES PATENT AND TRADEMARK OFFICE
CERTIFICATE OF CORRECTION

PATENT NO. : 4,771,523

DATED : September 20, 1988

INVENTOR(S) : Gulzar A. Qureshi et al.

It is certified that error appears in the above-identified patent and that said Letters Patent is hereby corrected as shown below:

Column 1, line 13, after "It" insert --is--.

Column 6, line 25, change the ";" to a period.

Column 8, line 1, change "coated" to --second coating--.

Signed and Sealed this

Fourteenth Day of February, 1989

Attest:

DONALD J. QUIGG

Attesting Officer

Commissioner of Patents and Trademarks